(12) United States Patent
Svensson et al.

(10) Patent No.: US 12,018,707 B2
(45) Date of Patent: Jun. 25, 2024

(54) MECHANICAL CONNECTION ARRANGEMENT FOR PANELS

(71) Applicant: Välinge Innovation AB, Viken (SE)

(72) Inventors: Johan Svensson, Kattarp (SE); Peter Derelöv, Viken (SE)

(73) Assignee: Välinge Innovation AB, Viken (SE)

( * ) Notice: Subject to any disclaimer, the term of this patent is extended or adjusted under 35 U.S.C. 154(b) by 0 days.

(21) Appl. No.: 17/674,262

(22) Filed: Feb. 17, 2022

(65) Prior Publication Data

US 2022/0275821 A1 Sep. 1, 2022

(30) Foreign Application Priority Data

Mar. 1, 2021 (EP) ...................................... 21160002
Jan. 31, 2022 (SE) .................................... 2250091-2

(51) Int. Cl.
*F16B 12/26* (2006.01)
*A47B 47/04* (2006.01)
*F16B 12/24* (2006.01)

(52) U.S. Cl.
CPC ............ *F16B 12/26* (2013.01); *A47B 47/042* (2013.01); *F16B 12/24* (2013.01)

(58) Field of Classification Search
CPC .. F16B 12/24; F16B 12/125; F16B 2012/103; F16B 12/26; F16B 12/46; F16B 12/10;

(Continued)

(56) References Cited

U.S. PATENT DOCUMENTS 1,726,362 A * 8/1929 Orsenigo ................ F16B 12/24
  403/297
1,954,242 A * 4/1934 Heppenstall ......... A47B 47/042
  403/381

(Continued)

FOREIGN PATENT DOCUMENTS

WO WO 2020/046193 A1 3/2020
WO WO 2020/046194 A1 3/2020

OTHER PUBLICATIONS

Derelöv, Peter, et al., U.S. Appl. No. 17/588,733 entitled "Arrangements for Preparing of Furniture Product," filed in the U.S. Patent and Trademark Office Jan. 31, 2022.

(Continued)

*Primary Examiner* — Hiwot E Tefera
(74) *Attorney, Agent, or Firm* — Boone IP Law (57) ABSTRACT

A mechanical connection arrangement for panels, includes a first panel, a second panel and a mechanical locking device for locking the first panel to the second panel. A surface of the first panel and a surface of the second panel are parallel and in contact in a locked position of the first and second panels. The mechanical locking device includes at least one rod-shaped element at said surface of the first panel and at least one corresponding insertion recess at said surface of the second panel. The rod-shaped element is configured to be inserted in the insertion recess. The rod-shaped element extends at a first angle from the surface of the first panel and the insertion recess extends into the second panel at a second angle from the surface of the second panel. The difference between the first angle and the second angle is between 0.5° and 6°.

18 Claims, 9 Drawing Sheets

(58) Field of Classification Search
CPC ........ F16B 12/20; F16B 12/12; A47B 47/042; A47B 2230/0037; A47B 2230/06; A47B 47/0075; A47B 2230/0081; A47B 2230/0096; A47B 2095/006
See application file for complete search history.

(56) References Cited

U.S. PATENT DOCUMENTS

| | | | |
|---|---|---|---|
| 4,194,642 A * | 3/1980 | Glavan | A47B 47/042 217/65 |
| 4,496,260 A * | 1/1985 | Brunn | F16B 12/20 5/294 |
| 4,565,042 A * | 1/1986 | von Poschinger-Camphausen | A47B 47/042 446/122 |
| 8,887,468 B2 | 11/2014 | Håkansson et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,714,672 B2 | 7/2017 | Derelöv et al. | |
| 9,714,673 B2 * | 7/2017 | Phillips | F16B 12/26 |
| 9,723,923 B2 | 8/2017 | Derelöv | |
| 9,726,210 B2 | 8/2017 | Derelöv et al. | |
| 9,945,121 B2 | 4/2018 | Derelöv | |
| 10,005,586 B1 * | 6/2018 | Miller | B65D 19/0095 |
| 10,034,541 B2 | 7/2018 | Boo et al. | |
| 10,202,996 B2 | 2/2019 | Håkansson et al. | |
| 10,415,613 B2 | 9/2019 | Boo | |
| 10,448,739 B2 | 10/2019 | Derelöv et al. | |
| 10,451,097 B2 | 10/2019 | Brännström et al. | |
| 10,486,245 B2 | 11/2019 | Fridlund | |
| 10,506,875 B2 | 12/2019 | Boo et al. | |
| 10,544,818 B2 | 1/2020 | Fridlund | |
| 10,548,397 B2 | 2/2020 | Derelöv et al. | |
| 10,669,716 B2 | 6/2020 | Derelöv | |
| 10,670,064 B2 | 6/2020 | Derelöv | |
| 10,724,564 B2 | 7/2020 | Derelöv | |
| 10,731,688 B2 | 8/2020 | Brännström et al. | |
| 10,736,416 B2 | 8/2020 | Derelöv et al. | |
| 10,830,266 B2 | 11/2020 | Fridlund | |
| 10,830,268 B2 | 11/2020 | Boo | |
| 10,871,179 B2 | 12/2020 | Håkansson et al. | |
| 10,876,562 B2 | 12/2020 | Pervan | |
| 10,876,563 B2 | 12/2020 | Derelöv et al. | |
| 10,968,936 B2 | 4/2021 | Boo et al. | |
| 11,076,691 B2 | 8/2021 | Boo | |
| 11,083,287 B2 | 8/2021 | Boo et al. | |
| 11,098,484 B2 | 8/2021 | Derelöv | |
| 11,137,007 B2 | 10/2021 | Fridlund | |
| 11,204,051 B2 | 12/2021 | Brännström et al. | |
| 11,246,415 B2 | 2/2022 | Derelöv et al. | |
| 11,272,783 B2 | 3/2022 | Derelöv | |
| 11,326,636 B2 | 5/2022 | Pervan | |
| 11,877,657 B2 * | 1/2024 | Cattaneo | F16B 12/26 |
| 2005/0076484 A1 * | 4/2005 | Sussenbach | F16B 21/186 24/662 |
| 2005/0100399 A1 * | 5/2005 | Welch | F16B 12/04 403/292 |
| 2012/0107042 A1 * | 5/2012 | Schneider | F16B 12/125 403/381 |
| 2012/0279161 A1 | 11/2012 | Håkansson et al. | |
| 2013/0170904 A1 * | 7/2013 | Cappelle | F16B 5/00 403/381 |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2015/0345532 A1 * | 12/2015 | Baur | F16B 12/26 403/326 |
| 2016/0007751 A1 | 1/2016 | Derelöv | |
| 2016/0174704 A1 | 6/2016 | Boo et al. | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0360193 A1 | 12/2017 | Boo et al. | |
| 2018/0080488 A1 | 3/2018 | Derelöv | |
| 2018/0087552 A1 | 3/2018 | Derelöv et al. | |
| 2018/0112695 A1 | 4/2018 | Boo et al. | |
| 2018/0119717 A1 | 5/2018 | Derelöv | |
| 2018/0202160 A1 | 7/2018 | Derelöv | |
| 2018/0328396 A1 | 11/2018 | Fransson et al. | |
| 2018/0368575 A1 * | 12/2018 | Dalstam | F16B 12/24 |
| 2019/0059593 A1 * | 2/2019 | Davis | B27F 1/12 |
| 2019/0113061 A1 | 4/2019 | Håkansson et al. | |
| 2019/0128300 A1 * | 5/2019 | Haser | F16B 12/26 |
| 2019/0166989 A1 | 6/2019 | Boo et al. | |
| 2019/0191870 A1 | 6/2019 | Derelöv | |
| 2019/0195256 A1 | 6/2019 | Derelöv | |
| 2019/0289999 A1 | 9/2019 | Derelöv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelöv | |
| 2019/0323535 A1 | 10/2019 | Derelöv | |
| 2020/0003242 A1 * | 1/2020 | Brännström | F16B 12/10 |
| 2020/0055126 A1 | 2/2020 | Fridlund | |
| 2020/0069048 A1 | 3/2020 | Derelöv et al. | |
| 2020/0069049 A1 | 3/2020 | Derelöv et al. | |
| 2020/0102978 A1 | 4/2020 | Fridlund | |
| 2020/0121076 A1 | 4/2020 | Derelöv et al. | |
| 2020/0214447 A1 | 7/2020 | Derelöv et al. | |
| 2020/0300284 A1 | 9/2020 | Pervan | |
| 2020/0337455 A1 | 10/2020 | Boo et al. | |
| 2020/0340513 A1 | 10/2020 | Derelöv | |
| 2021/0079650 A1 | 3/2021 | Derelöv | |
| 2021/0148392 A1 | 5/2021 | Brännström et al. | |
| 2021/0180630 A1 | 6/2021 | Bruno et al. | |
| 2021/0190112 A1 | 6/2021 | Derelöv | |
| 2021/0207635 A1 | 7/2021 | Håkansson et al. | |
| 2021/0222716 A1 | 7/2021 | Derelöv et al. | |
| 2021/0262507 A1 | 8/2021 | Svensson et al. | |
| 2021/0262508 A1 | 8/2021 | Svensson et al. | |
| 2021/0276108 A1 | 9/2021 | Derelöv et al. | |
| 2021/0285480 A1 | 9/2021 | Derelöv et al. | |
| 2021/0381251 A1 | 12/2021 | Svensson | |
| 2022/0018373 A1 | 1/2022 | Boo | |
| 2022/0049735 A1 | 2/2022 | Meijer | |
| 2022/0186761 A1 | 6/2022 | Derelöv et al. | |

OTHER PUBLICATIONS

Svensson, Johan, U.S. Appl. No. 17/709,994 entitled "Mechanical Connection Arrangement for Panels," filed in the U.S. Patent and Trademark Office Mar. 31, 2022.

Svensson, Johan, U.S. Appl. No. 17/710,055 entitled "Static Load Compression Spring," filed in the U.S. Patent and Trademark Office Mar. 31, 2022.

European Search Report and Written Opinion with English translation dated Aug. 16, 2021, by the European Patent Office as the Internal Searching Authority for International Application No. (EP21160002).

* cited by examiner

MECHANICAL CONNECTION ARRANGEMENT FOR PANELS

CROSS REFERENCE TO RELATED APPLICATIONS

The present application claims the benefit of European Application No. 21160002.8, filed on Mar. 1, 2021, and the benefit of Swedish Application No. 2250091-2, filed on Jan. 31, 2022. The entire contents of each of European Application No. 21160002.8 and Swedish Application No. 2250091-2 are hereby incorporated herein by reference in their entirety.

TECHNICAL FIELD

The present application concerns a mechanical connection arrangement for panels and a method for connecting panels using the mechanical connection arrangement. The arrangement comprises a first panel, a second panel and a mechanical locking device for locking the first panel to the second panel. A surface of the first panel and a surface of the second panel are parallel and in contact in a locked position of the first and second panels. The mechanical locking device comprises at least one rod-shaped element at said surface of the first panel and at least one corresponding insertion recess at said surface of the second panel. The rod-shaped element is configured to be inserted in the insertion recess. The rod-shaped element extends at a first angle from the surface of the first panel. The insertion recess extends into the second panel at a second angle from the surface of the second panel.

BACKGROUND

Assembling two or more objects into one piece, for instance furniture, has historically required tools such as drills, screwdrivers, hammers, and wrenches.

Starting with click floors, assembling not requiring tools has further been developed and more or less all types of furniture in a household could be assembled without tools or at least with a minimum of tools.

WO 2020/046193 discloses a set including a first panel, a second panel and a mechanical locking device for locking the first panel to the second panel. The first panel includes a first edge surface and the second panel includes a second panel surfaced. The mechanical locking device includes at least one rod-shaped element that extends at a first angle from the first edge surface. An insertion groove extends into the second panel surface at a second angle from the second panel surface. The mechanical locking device further includes at least one locking groove and at least one locking part. The locking groove includes at least one locking surface extending at a third angled from the first edge surface or from the second panel surface. The locking part is configured to be inserted into the locking groove and lock against the locking surface. The third angle is different than the first angle.

WO 2020/046194 discloses a set including a first panel, a second panel and a mechanical locking device for locking the first panel to the second panel. The first panel includes a first edge surface and the second panel includes a second panel surface. The mechanical locking device includes at least one rod-shaped element at the first edge surface and at least one insertion groove at the second panel surface. The rod-shaped element is configured to be inserted into the insertion groove. Said set is also comprising a back panel configured to be inserted in and to cooperate with at least one of the first and second panel grooves and at least one locking gear configured to cooperate with the back panel and the first and/or second panel groove, for locking of the first panel to the second panel.

SUMMARY

Accordingly, embodiments of the present disclosure preferably seek to further provide alternative mounting solutions that require a minimum of tools and that facilitates having a tight fit between two panels by providing a mechanical connection arrangement and a method of connecting to panels with such a mechanical connection arrangement according to the appended patent claims.

According to one aspect of the present disclosure, a mechanical connection arrangement for panels comprises a first panel, a second panel and a mechanical locking device for locking the first panel to the second panel. A surface of the first panel and a surface of the second panel are parallel and in contact in a locked position of the first and second panels. The mechanical locking device comprises at least one rod-shaped element at said surface of the first panel and at least one corresponding insertion recess at said surface of the second panel. The rod-shaped element is configured to be inserted in the insertion recess. The lateral side of the rod-shaped element extends at a first angle from the surface of the first panel and the lateral side of the insertion recess extends into the second panel at a second angle from the surface of the second panel. The difference between the first angle and the second angle is in a range of about 0.5° to about 6° in an unlocked position of the first and second panels wherein the rod-shaped element and the insertion recess are arranged such that the difference between the first angle and the second angle is smaller in the locked position compared to when in the non-locked position.

In the context of this disclosure, a panel is a flat piece of construction material made to form a part of a surface or a complete surface. Generally, panels used for furniture are rectangular such that they have two opposing flat surface sides and four edge surfaces that are parallel in pairs. However, panels having other shapes are not excluded, such as for instance triangular panels. Also, panels having at least one bevelled edge each, usually at 45°, such that two panels can form a miter joint is also considered in the context of the disclosure.

Also, the rod-shaped element could have an equally large cross-section area throughout the entire length with the insertion recess having a corresponding shape. In a further possible embodiment, the rod-shaped element could have the shape of a truncated cone and the insertion recess could have a shape that allows for a misalignment between the angles of the lateral sides of the rod-shaped element and the insertion recess. Thus, the concept could be achieved with for instance a cylindrical rod-shaped element and an insertion recess having a narrowing cross-section inwardly.

The tolerance for the angles when drilling/producing holes are generally well below 0.5° in modern production facilities. One of the ideas with the present solution is to deliberately provide a misalignment of the angle of the insertion recess in one panel and the angle of a rod-shaped element protruding from another panel when the two panels are to be connected using the rod-shaped element and the insertion recess. For facilitating the understanding, the insertion recess may be a cylindrical hole with an axis having a specific angle relative the surface where the opening of the hole is. The rod-shaped element may be cylinder-shaped, i.e., having a cylindrical cross section and also an axis in another angle relative the surface from which the rod-shaped element is protruding. Normally, the panel with the rod-shaped element is made by inserting a rod-shaped element into a hole drilled or made in some other way in a panel.

The deliberate misalignment of the insertion recess and the rod-shaped element provides for a tighter fit between the two panels since pressing the panels together such that the surface of the first panel and the surface of the second panel come into full contact with each other will result in the rod-shaped element partially compressing the inside of the insertion recess to plastic and/or elastic deformation and/or partially compressing the side of the rod-shaped element to plastic and/or elastic deformation inside the insertion recess and/or bending the rod-shaped element plastically and/or elastically. The deformation/compression of either the insertion recess and/or the rod-shaped element will provide for a stronger connection between the two panels than if the insertion recess and rod-shaped element would have been normally aligned for a typical plug and socket connection. This is a result of that the rod-shaped element and the insertion recess are arranged such that the difference between the first angle and the second angle is smaller in the locked position of the panels compared to when in the non-locked position.

According to an aspect of the present disclosure the difference in the unlocked position between the first angle and the second angle may be in a range of about 0.5° to about 6°, in a range of about 2° to about 4°, or about 3°. For applications regarding panels used for furniture, this angle range may be advantageous.

According to another aspect of the present disclosure, the rod-shaped element is made of a material that is harder than at least the core of the second panel. Thus, the inside of the second panel is subjected to a somewhat greater compression/deformation as compared to the rod-shaped element.

According to an alternative aspect of the present disclosure, the second panel has an outer layer adjacent said surface that is harder than the material in the core of the panel. The insertion recess opening is more likely not to be affected by the compression/deformation which is an advantage for the positioning of the two panels relative each other. Rather, the inside of the panel will be compressed/deformed before the opening of the insertion recess will be compressed/deformed.

According to yet another aspect of the present disclosure wherein the rod-shaped element is made from one of or a combination of wood-based materials, polymers, and metals.

Further to materials, according to one aspect of the present disclosure, at least the core of the second panel is wood-based or plastic with or without fillers.

According to a further aspect of the present disclosure, the rod-shaped element is cylinder-shaped and the insertion recess has a circular cross section. The diameter of the rod-shaped element is about 90% to 98% of the diameter of the insertion recess, or more preferably 92% to 97% of the diameter of the insertion recess, and most preferably 94% to 96% of the diameter of the insertion recess.

According to yet a further aspect both the first and second angles are in the range of 30° to 60° and more preferably 40° to 50°. Traditionally when assembling furniture rod-shaped elements and corresponding insertion recesses are made with vertical alignment, i.e., with 90° angles. However, with the misalignment strategy it has shown to be advantageous to deviate from having a vertical alignment. Also, if two panels having each a bevelled edge at 45° and the bevelled edges are to be connected to make a miter joint, the angles are also preferably deviating from a traditional vertical alignment, i.e., relative the contact surfaces of the panels.

According to yet another aspect of the present disclosure, the thickness of the second panel is larger than the diameter of a cylindrical rod-shaped element and smaller than three times the diameter of the cylindrical rod-shaped element.

According to an aspect of the present disclosure the first angle is smaller than the second angle. This facilitates slightly the assembly of the two panels. However, the locking principle still works with the reversed situation, i.e., the first angle being larger than the second angle.

According to another aspect of the present disclosure, the length of contact between the rod-shaped element and the insertion recess on the side closest to the panel side with the insertion recess is longer than the radius of a cylindrical rod-shaped element and shorter than two times the diameter of the rod-shaped element. If the contact length is too short there will be a minimum of the locking properties. If the contact length is too long, it may result in the tension or load on the rod-shaped element and/or the insertion recess being higher than the strength and instead of a tight fit and a lock, the rod-shaped element and/or the panel with the insertion recess might break. Also, a too long contact length may lead to that the two panels are not being able to be brought into contact with each other.

The insertion recess has according to a further aspect of the present disclosure a countersink. This is particularly advantageous if the panel with the insertion recess has a harder outer layer as compared to the core of the panel. Making the countersink corresponding to the thickness of the harder outer layer may prevent that the rod-shaped element affect the surface of the second panel. Also, the harder surface may not affect the rod-shaped element. Depending on the combination of materials in the panel versus the rod-shaped element, it may be that the rod-shaped element presses the edge of the insertion recess and thus deforming the surface surrounding the insertion recess if no countersink is present.

According to a further aspect of the present disclosure the first panel further comprises a second rod-shaped element extending at the same angle as said first rod-shaped element wherein the second rod-shaped element is shorter than said first rod-shaped element. Thus, the second rod-shaped element will not extend as far into its insertion recess of the second panel as said first rod-shaped element. This allows for easier assembly/connection of the two panels. If, for instance, there are more than two rod-shaped elements for one connection, every other of the rod-shaped elements could be shorter.

In order to further secure the connection of the two panels, according to a further aspect of the present disclosure the connection arrangement further comprises a locking arrangement. The locking arrangement is arranged such that the rod-shaped element and insertion recess do not detach and thus the two panels. For instance, a spring-loaded element extending at an angle different from the rod-shaped element could be arranged to snap into an insertion recess when the two panels are in a final/desired position relative each other. A further alternative could be a simple screw or nail that is inserted such that movement of the rod-shaped element in an axial direction out of the insertion recess is prevented.

According to a further aspect of the present disclosure a method is provided for connecting two panels to one another with an arrangement as previously disclosed. The method comprises placing the panel with the rod-shaped element such that the tip of the rod-shaped element is arranged at the insertion recess of the second panel and such that the axis of the rod-shaped element is in line with the axis of the insertion recess.

Also, bringing the panels together by inserting the rod-shaped element into the insertion recess, and pressing the panels together such that the surface of the first panel and the surface of the second panel come into full contact with each other and a locked position by the rod-shaped element partially compressing the inside of the insertion recess to plastic and/or elastic deformation and/or partially compressing the side of the rod-shaped element to plastic and/or elastic deformation inside the insertion recess and/or bending the rod-shaped element plastically and/or elastically.

It should be emphasized that the term "comprises/comprising" when used in this specification is taken to specify the presence of stated features, integers, steps, or components but does not preclude the presence or addition of one or more other features, integers, steps, components, or groups thereof.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DETAILED DESCRIPTION OF EXAMPLE EMBODIMENTS

Specific embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings and in the description, like numbers refer to like elements.

Figure 1:
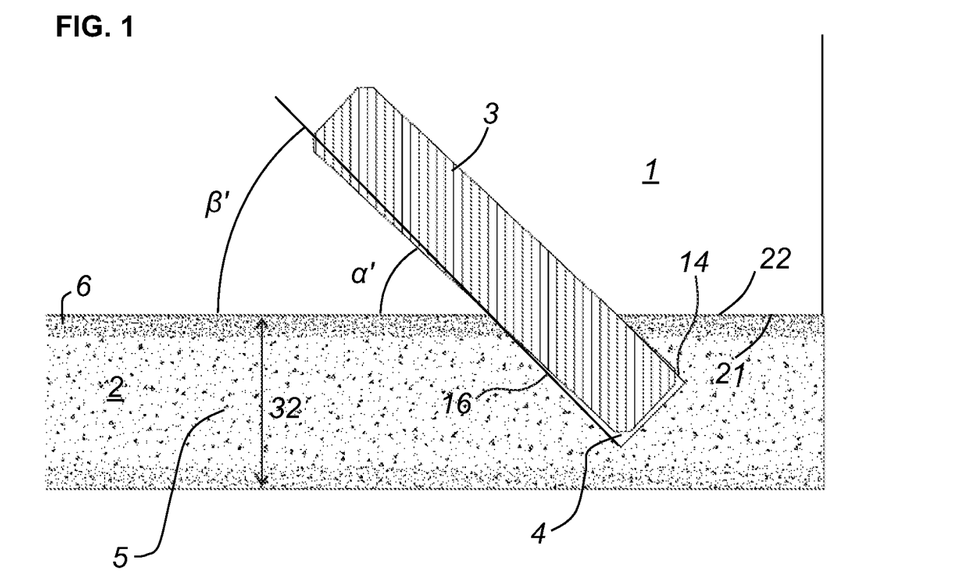
FIG. 1 is a partial cross section of an embodiment according to the present disclosure.

FIG. 1 shows a mechanical connection arrangement for panels 1, 2, comprising a first panel 1, a second panel 2, and a mechanical locking device for locking the first panel 1 to the second panel 2. A surface 21 of the first panel 1 and a surface 22 of the second panel 2 are parallel and in contact in a locked position of the first and second panels 1, 2. The mechanical locking device comprises a rod-shaped element 3 at said surface of the first panel 1 and one corresponding insertion recess 4 at said surface of the second panel 2. The rod-shaped element 3 is inserted in the insertion recess 4. The rod-shaped element 3 extends at a first angle $\alpha'$ from the surface 21 of the first panel 1 and the insertion recess 4 extends into the second panel 2 at a second angle $\beta'$ from the surface of the second panel 2.

FIG. 1 shows the first panel 1 and second panel 2 in the locked position. The difference in the locked position between the first angle $\alpha'$ and the second angle $\beta'$ is in a range of about 0 to about 3° and more preferably in a range of about 1° to about 2°. In the shown embodiment the first angle $\alpha'$ is smaller than the second angle $\beta'$.

The first panel 1 and/or of the second panel 2 may be a wood-based panel, such as comprising a MDF, HDF, OSB, WPC, plywood, or particleboard.

The first panel 1 and/or of the second panel 2 may comprise a plastic material, such as thermosetting plastic or thermoplastic e.g., vinyl, PVC, PU or PET. The plastic material may comprise fillers.

The first panel 1 and/or the second panel 2 may also comprise a solid wood board.

The first panel 1 and/or the second panel 2 may comprise a decorative layer, such as a foil or a veneer, on one or more surfaces.

Figure 7:
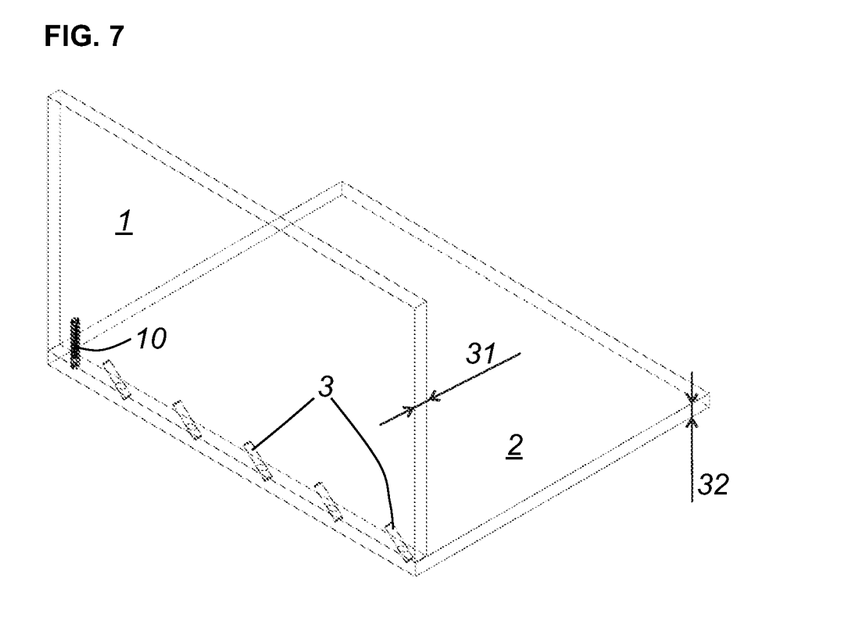
FIG. 7 is a perspective view of two panels attached to each other with a connection arrangement of the present disclosure.

A thickness 31 of the first panel 1, see FIG. 7, and/or a thickness 32 of the second panel 2 may be in a range of about 8 mm to about 30 mm, or in a range of about 12 mm to about 25 mm, or about 20 mm Also illustrated in FIG. 1 is that the second panel 2 has an outer layer 6 adjacent said surface that is harder than the material in the core 5 of the panel. For instance, the second panel 2 could be of a wood-based material that is compressed on the top and bottom faces of the panel 2 such that the outer layer 6 closest to surface(s) has a higher density and thus harder. The thickness of the outer layer 6 may be 0.5 to 4 mm, such as 1 to 3 mm, such as 1.5 to 2.5 mm.

Further, in the shown embodiment the rod-shaped element 3 is made of a material that is harder than the core 5 of the second panel 2. The hardness may be measured by a Brinell test according to ASTM E10-18 or, for wood based materials, a Janka hardness test according to ASTM D143-21. In this embodiment, the relative hardness may be indicated by that the rod-shaped element 3 being unaffected, i.e., it may still have a uniform diameter. Also, in the insertion recess 4 on the side closest to the surface the rod-shaped element 3 has been forced into the core of the panel such that the insertion recess side is compressed. This is an effect of the misalignment or there being a difference in angles α, β.

The insertion recess 4 comprises an upper side 14 and an opposite lower side 16.

In the shown embodiment the rod-shaped element 3 is cylinder-shaped and the insertion recess 4 has a circular cross section. The diameter of the rod-shaped element 3 is about 90% to 98% of the diameter of the insertion recess 4, or more preferably 92% to 97% of the diameter of the insertion recess 4, and most preferably 94% to 96% of the diameter of the insertion recess 4. An example of preferred diameters would be to have the rod-shaped element 3 with a diameter of 8 mm and the insertion recess 4 with a diameter of 8.4 mm.

If the second panel 2 is made of wood-based material it is preferred if also the rod-shaped element 3 is made of a wood-based material. However, any combination could work, for instance, if the panel is wood-based or plastic with or without fillers, the rod-shaped element could be made from one of or a combination of wood-based materials, polymers, and metals. Exemplary fillers may include one or more of chalk, glass fibre or carbon fibre.

In an embodiment, both the first and second angles α, β are in the range of 30° to 60° and more preferably 40° to 50° or about 45° as in the shown embodiment.

In an embodiment, the thickness of the second panel 2 is larger than the diameter of the rod-shaped element 3 and smaller than three times the diameter of the rod-shaped element 3. Also, in an embodiment, the length of contact between the rod-shaped element 3 and the insertion recess 4 on the upper side 14 is longer than the radius of the rod-shaped element 3 and shorter than two times the diameter of the rod-shaped element 3.

Thus, when assembled, the panel 1 with the rod-shaped element 3 is placed such that the tip of the rod-shaped element 3 is arranged at the opening of the insertion recess 4 of the second panel and such that the axis of the rod-shaped element 3 is aligned with the axis of the insertion recess 4. Next, the panels 1, 2 are brought together by inserting the rod-shaped element 3 into the insertion recess 4. Finally, the panels 1, 2 are pressed together such that the surface of the first panel 1 and the surface of the second panel 2 come into full contact with each other and a locked position by the rod-shaped element 3 partially compressing the inside of the insertion recess 4. The compression results in plastic and/or elastic deformation and/or partially the side of the rod-shaped element 3 to plastic and/or elastic deformation inside the insertion recess and/or bending the rod-shaped element 3 plastically and/or elastically. In the shown example, only the inside of the insertion recess 4 is plastically and/or elastically deformed by the compression. Also, in the shown embodiment, since the outer layer 6 of the panel 2 is harder than the core 5 of the panel 2, the opening of the insertion recess 4 functions as pivot point for the rod-shaped element, i.e., only, or at least primarily only, the core 5 is affected by the misalignment between the axis of the rod-shaped element 3 and the axis of the insertion recess 4 when the panels 1, 2 are pressed together into full contact with one another.

In FIG. 1, the panel 1 with the rod-shaped element 3 could be considered as a cuboid in the sense that the contact surface of panel 1 is an edge surface and the contact surface of panel 2 is a face surface.

Figure 2:
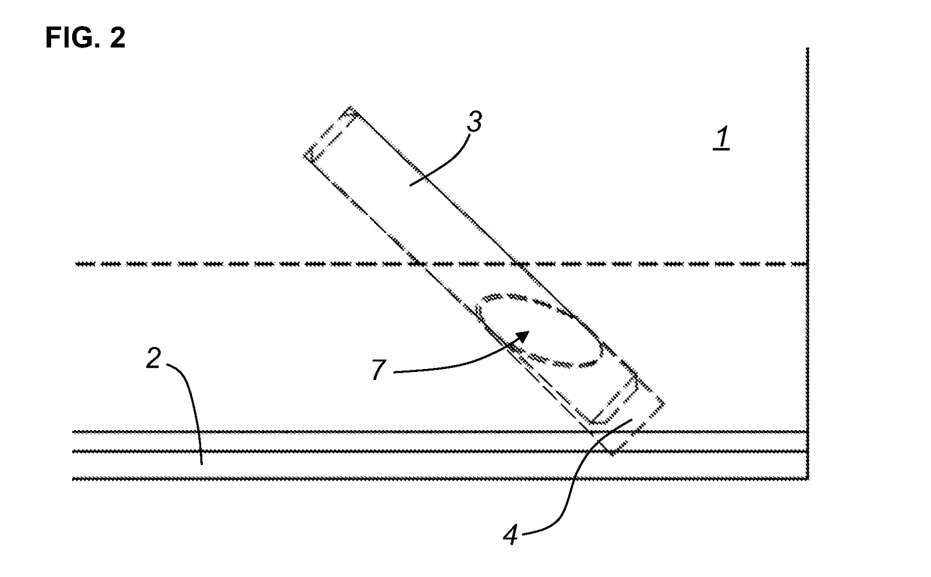
FIG. 2 is a partial side view of a further embodiment according to the present disclosure.
Figure 3:
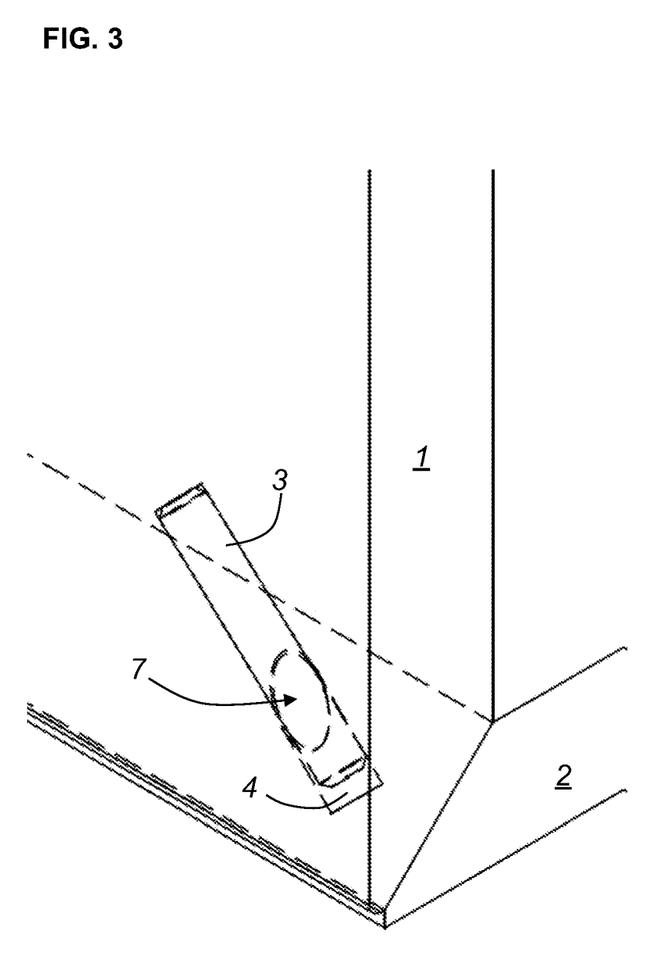
FIG. 3 is a partial perspective of the embodiment shown in FIG. 2.
Figure 4:
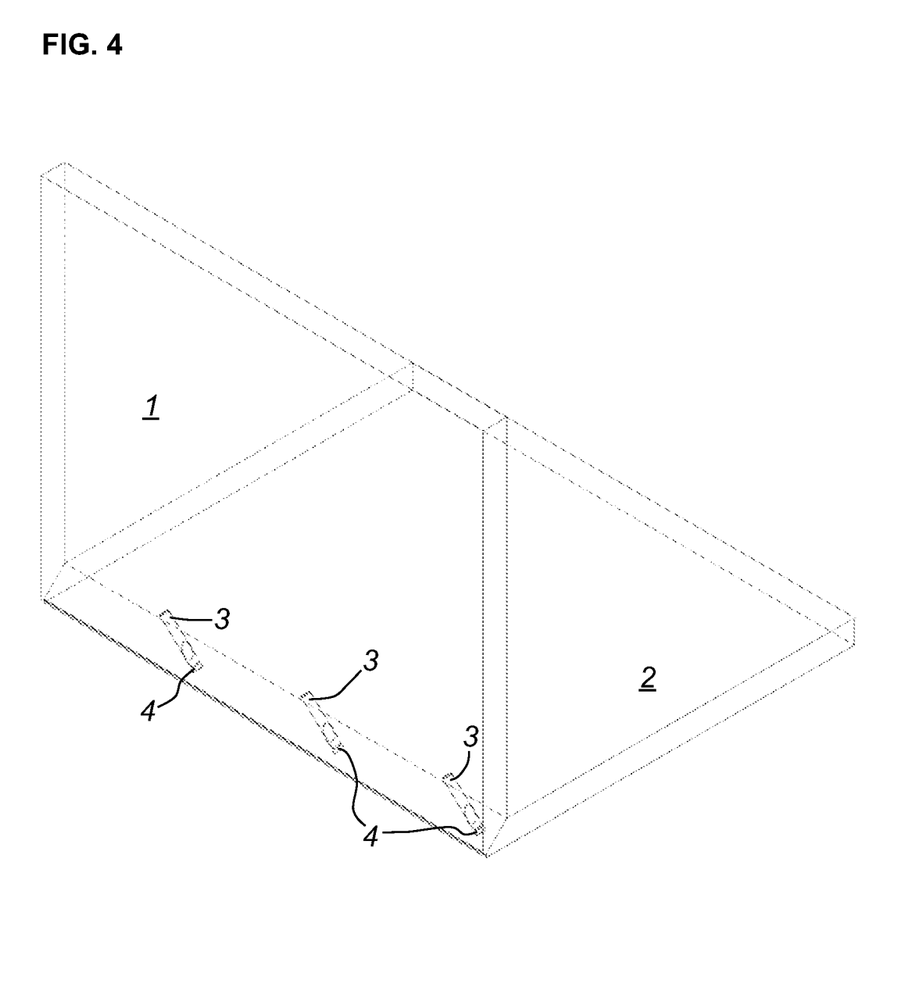
FIG. 4 is a perspective view of an embodiment according to the present disclosure.

Turning to FIGS. 2-4, an alternative to the contact surfaces shown in FIG. 1 is shown. One edge on each panel 1, 2 has a bevelling and these bevelled edges are in contact with one another to form a miter joint. The figures show a mechanical connection arrangement for panels 1, 2, comprising a first panel 1, a second panel 2, and a mechanical locking device for locking the first panel 1 to the second panel 2. A surface of the first panel 1 and a surface of the second panel 2 are parallel and in contact in the locked position of the first and second panels 1, 2. The mechanical locking device comprises a rod-shaped element 3 at said surface of the first panel 1 and one corresponding insertion recess 4 at said surface of the second panel 2. The rod-shaped element 3 is inserted in the insertion recess 4. The rod-shaped element 3 extends at a first angle from the surface of the first panel 1 and the insertion recess 4 extends into the second panel 2 at a second angle from the surface of the second panel 2.

In the locked position a difference between the first angle α' and the second angle β' may be in a range of about 0 to about 3° and more preferably in a range of about 1° to about 2°. In the shown embodiment the first angle α' is smaller than the second angle β'

In the shown embodiment of FIGS. 2-4, the rod-shaped element 3 is cylinder-shaped and the insertion recess 4 has a circular cross section. The diameter of the rod-shaped element 3 is about 90% to 98% of the diameter of the insertion recess 4, or more preferably 92% to 97% of the diameter of the recess 4, and most preferably 94% to 96% of the diameter of the insertion recess 4. An example of preferred diameters would be to have the rod-shaped element 3 with a diameter of 8 mm and the insertion recess 4 with a diameter of 8.4 mm.

If the second panel 2 is made of wood-based material, it is preferred if also the rod-shaped element 3 is made of a wood-based material. However, any combination could work, for instance, if the panel is wood-based or plastic with or without fillers, the rod-shaped element could be made from one of or a combination of wood-based materials, polymers, and metals.

In an embodiment, both the first and second angles are in the range of 30° to 60° and more preferably in the range of 40° to 50°.

In an embodiment, the thickness of the second panel 2 is larger than the diameter of the rod-shaped element 3 and smaller than three times the diameter of the rod-shaped element 3. Also, in an embodiment, the length of contact between the rod-shaped element 3 and the insertion recess 4 on the upper side 14 is longer than the radius of the rod-shaped element 3 and shorter than two times the diameter of the rod-shaped element 3.

Thus, when assembled, the panel 1 with the rod-shaped element 3 is placed such that the tip of the rod-shaped element 3 is arranged at the opening 7 of the insertion recess 4 of the second panel and such that the axis of the rod-shaped element 3 is aligned with the axis of the insertion recess 4. Next, the panels 1, 2 are brought together by inserting the rod-shaped element 3 into the insertion recess 4. Finally, the panels 1, 2 are pressed together such that the surface of the first panel 1 and the surface of the second panel 2 come into full contact with each other and a locked position by the rod-shaped element 3 partially compressing the inside of the insertion recess 4. The compression results in plastic and/or elastic deformation and/or partially the side of the rod-shaped element 3 to plastic and/or elastic deformation inside the insertion recess and/or bending the rod-shaped element 3 plastically and/or elastically. In the shown example, only the inside of the insertion recess 4 is plastically and/or elastically deformed by the compression.

For having a more stable connection between the two panels 1, 2, at least two mechanical locking devices should be arranged along the contact surface and preferably evenly distributed. In FIG. 4, three locking devices are shown.

The rod-shaped element 3 is generally pushed/pressed into a much tighter insertion recess in the first panel 1 in a pre-assembly step. Generally, it is preferred that the rod-shaped element 3 extends longer into said panel compared to the length of the rod-shaped element 3 that extends into the insertion recess 4 of the second panel 2. In other words, the part of the rod-shaped element 3 that is embedded in the insertion recess 4 in an assembled state of the two panels 1, 2 is smaller than the part embedded in the first panel 1, lengthwise.

Figure 5:
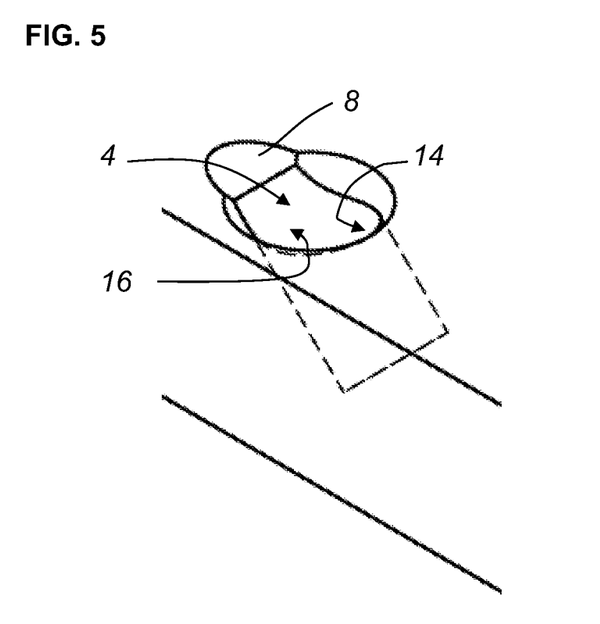
FIG. 5 is a perspective view of an alternative insertion recess according to the present disclosure.
Figure 6:
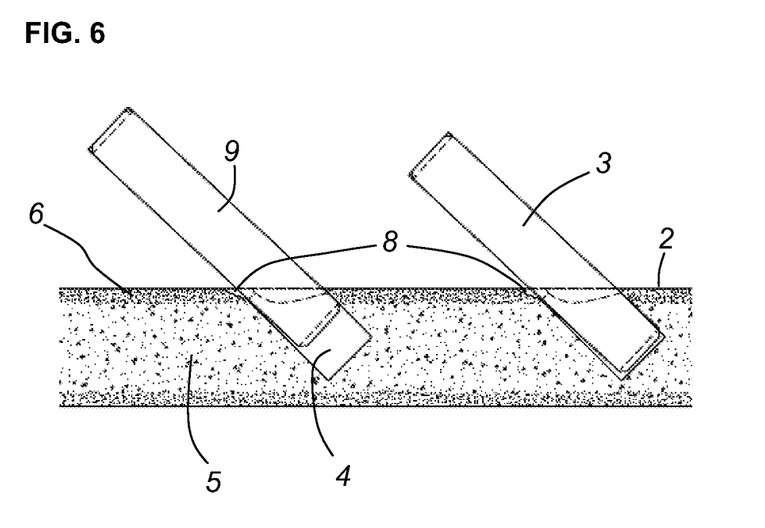
FIG. 6 is a side view of an alternative embodiment of connection arrangement according to the present disclosure.

In FIG. 5, an insertion recess 4 is shown with a countersink 8. The insertion recess 4 comprises an upper side 14 and an opposite lower side 16. The insertion recess 4 comprises the countersink 8 at the lower side 16, such as along 45 to 270°, such 90 to 180°, of the circumference of the insertion recess 4. This is particularly advantageous if the panel 2 with the insertion recess 4 has a harder outer layer 6 as compared to the core 5 of the panel 2 as is indicated in FIG. 6. Making the countersink 8 corresponding to the thickness of the harder outer layer 6 may prevent that the rod-shaped element 3, 9 affects the surface of the second panel 2. Also, the harder outer layer may not affect the rod-shaped element 3, 9. Depending on the combination of materials in the panel 2 versus the rod-shaped element 3, 9, it may be that the rod-shaped element 3, 9 presses the edge of the insertion recess and thus deforming the surface surrounding the insertion recess 4 if no countersink 8 is present.

Also, in FIG. 6, the first panel further comprises another rod-shaped element 9 extending at the same angle as the first rod-shaped element 3. In an embodiment, second rod-shaped element 9 will not extend as far into its insertion recess 4 of the second panel 2 as the first rod-shaped element 3.

As shown in FIG. 6, the second rod-shaped element 9 is shorter than the first rod-shaped element 3 and is arranged such that the second rod-shaped element 9 will not extend as far into its insertion recess 4 of the second panel 2 as the first rod-shaped element 3. In another embodiment, the second rod-shaped element 9 is embedded deeper in the first panel 1, such that the second rod-shaped element 9 will not extend as far into its insertion recess 4 of the second panel 2 as the first rod-shaped element 3. Having the second rod-shaped element 9 not extend as far into its insertion recess 4 of the second panel 2 as the first rod-shaped element 3 allows for easier assembly/connection of the two panels.

When assembling/connecting the two panels, the first rod-shaped element 3 is first inserted into its insertion recess and only when the connection is coming close to being completed the second rod-shaped element 9 enters its insertion recess 4 and a final pressing of the first panel towards the second panel 2 can be made using a smaller force as compared to if the two rod-shaped elements would have been equally long. Preferably, the longer of the rod-shaped elements is arranged to be positioned the closest to a corner of the two panels being connected. For instance, in FIG. 7, if one of the rod-shaped elements only is the longer one it should be the one farthest to the right in the figure. The longer rod-shaped elements form a stronger connection between two panels since the contact surface between the rod-shaped element and the insertion recess is larger, and due to the misalignment, also provide for higher friction as a result of the larger compression.

Figure 8:
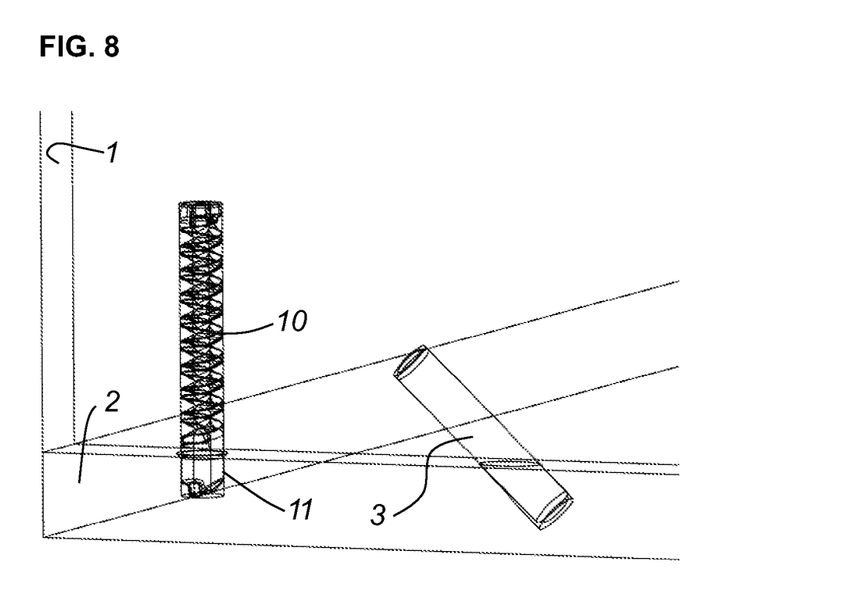
FIG. 8 is a partial enlargement of the arrangement shown in FIG. 7.

In order to further secure the connection of the two panels 1, 2, the connection arrangement may further comprise a locking arrangement 10, 11. The locking arrangement is arranged such that the rod-shaped element 3, 9 and the insertion recess 4 do not detach and thus the two panels 1, 2. In FIGS. 7 and 8 is shown how a spring-loaded element 10 extends at an angle different from the rod-shaped elements 3, 9 and is arranged to snap into a recess 11 when the two panels 1, 2 are in a final/desired position relative each other.

Figure 9:
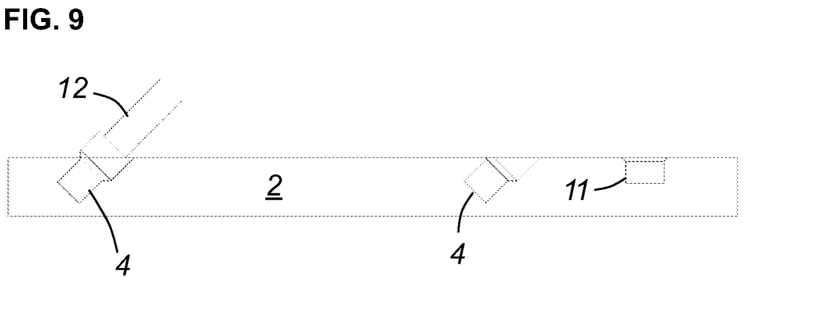
FIG. 9 is a side view of a countersink being made in a panel.
Figure 10:
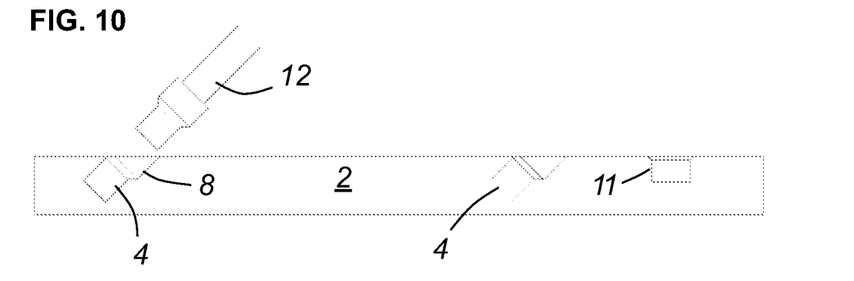
FIG. 10 is a side view of the panel in FIG. 9 after the drill is removed.

Turning to FIGS. 9 and 10, a drill 12 producing the countersink 8 in the second panel 2 can be seen. The countersink 8 enables the deliberate misalignment between the rod-shaped element 8 and the insertion recess 4 when the surface of the panel 2 is made of a harder material than the core of the panel or even harder than the rod-shaped element 3.

Figure 11:
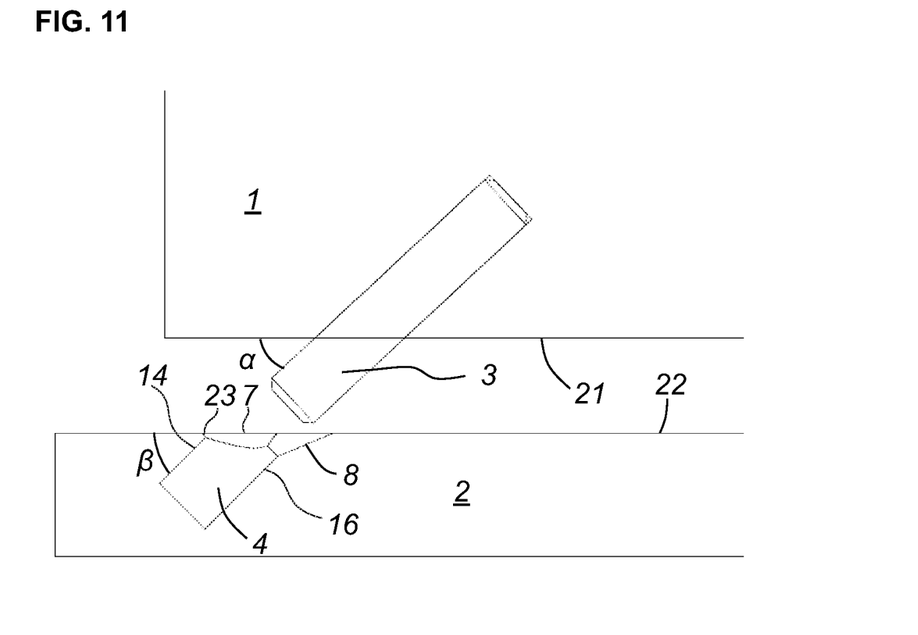
FIG. 11 is a partial side view showing an insertion recess and a rod-shaped element prior to connection of two panels.

As can be seen in FIG. 11 it may be easier to mount the two panels 1, 2 together when the second panel 2 has larger openings for the rod-shaped elements 3 to "find". The countersink may have the effect that the force required for entering the rod-shaped element 3 into the insertion recess 4 is decreased.

FIG. 11 shows the first panel 1 and second panel 2 in an unlocked position. A lateral surface of the rod-shaped element 3 extends at a first angle α from the surface 21 of the first panel 1, a lateral surface of the insertion recess 4 extends into the second panel 2 at a second angle β from the surface 22 of the second panel 2.

In the unlocked position a difference between the first angle (α) and the second angle (β) may be in a range of about 0.5° to about 6°, in a range of about 2° to about 4°, or about 3°.

The insertion recess 4 comprises an upper side 14 and an opposite lower side 16. The second panel 2 may comprise a countersink 8 at an opening 7 of the insertion recess 4 and at the lower side 16 of the insertion recess 4.

The second panel 2 may comprise a bevel 23 at an edge of an opening of the insertion recess 4 and at the upper side 16 of the recess 16. The bevel 23 is configured to make the edge of the opening blunt. A blunt edge may prevent that the edge cuts into the rod-shaped element 3 when the rod-shaped element 3 is displaced into the insertion recess 4.

Figure 12:
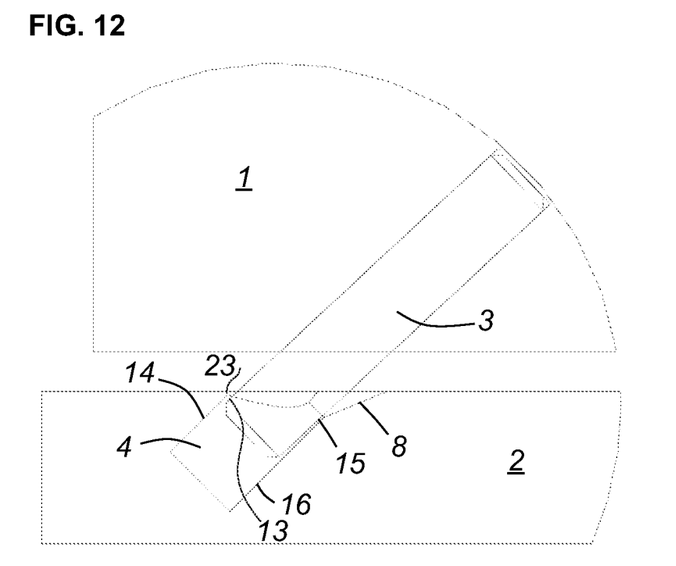
FIG. 12 is partial side view showing the rod-shaped element in the insertion recess at a first contact stage.

Moving on to FIG. 12, the rod-shaped element 3 is displaced into the insertion recess 4.

Initially an upper edge 13 of the rod-shaped element 3 may be in contact with the upper side 14 of the insertion recess 4. A lower edge 15 of the rod-shaped element 3 may be at a distance from the lower side 16 of the insertion recess 4.

Figure 13:
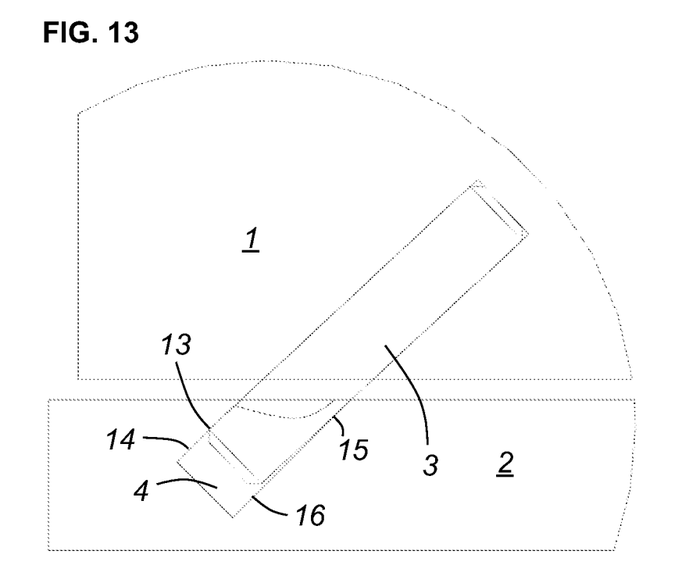
FIG. 13 is partial side view showing the rod-shaped element in another embodiment of the insertion recess at a first contact stage.

FIG. 13 shows an embodiment of the insertion recess 4 which does not comprise the counter sink. In this embodiment the rod-shaped element 3 is squeezed against the lower side 16 of the insertion recess 4 at the opening of the insertion recess 4.

Figure 14:
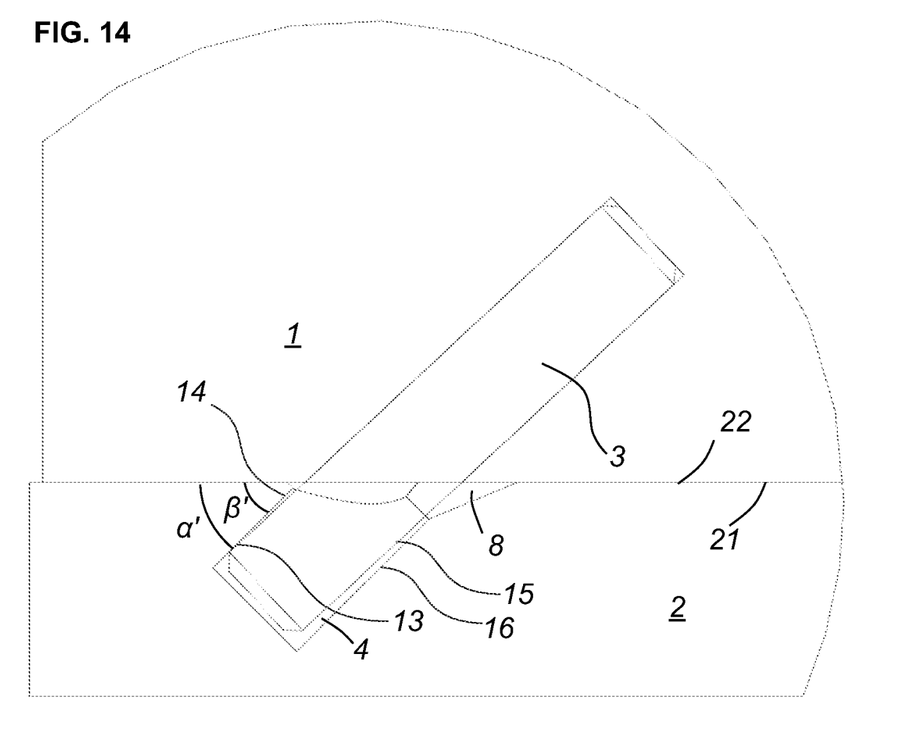
FIG. 14 is a partial side view showing the rod-shaped element fully inserted in the insertion recess.

In FIG. 14 the panels 1, 2 are in a locked position and the contact between the rod-shaped element 3 and the insertion recess 4 is increased due to that the compression results in plastic and/or elastic deformation and/or partially the side of the rod-shaped element 3 to plastic and/or elastic deformation inside the insertion recess and/or bending the rod-shaped element 3 plastically and/or elastically such that the difference in angle of the rod-shaped element 3 and the insertion recess 4 decreases in the locked position.

In the locked position, lower edge 15 of the rod-shaped element 3 may be at a distance from the lower side 16 of the insertion recess 4.

In the locked position, upper edge 13 of the rod-shaped element 3 may be in contact with the upper side 14 of the insertion recess 4.

In the locked position, a difference between the first angle (α) and the second angle (β) may be in a range of about 0° to about 3°, in a range of about 2° to about 4°, or about 3°.

In the locked position, a difference between the first angle α' and the second angle (3' may be in a range of about 0 to about 3° and more preferably in a range of about 1° to about 2°. In the shown embodiment the first angle α' is smaller than the second angle (3'.

FIG. 11-14 show that the two panels 1, 2 may be connected to one another by:

placing the panel 1 with the rod-shaped element 3 such that the tip of the rod-shaped element 3 is arranged at the opening 7 of the insertion recess 4 of the second panel and such that the axis of the rod-shaped element 3 is aligned with the axis of the insertion recess 4, bringing the panels 1, 2 together by inserting the rod-shaped element 3 into the insertion recess 4, pressing the panels 1, 2 together such that the surface of the first panel 1 and the surface of the second panel 2 come into full contact with each other and a locked position by the rod-shaped element 3 partially compressing the inside of the insertion recess 4 to plastic and/or elastic deformation and/or partially compressing the side of the rod-shaped element 3 to plastic and/or elastic deformation inside the insertion recess and/or bending the rod-shaped element 3 plastically and/or elastically.

Figure 15:
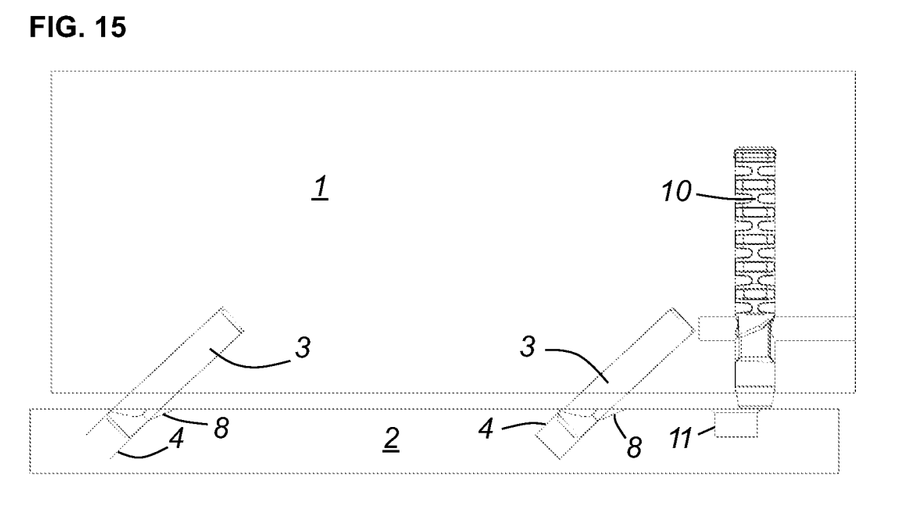
FIG. 15 is a side view of two panels at a first contact stage.

FIG. 15 shows the connection of two panels 1, 2 and more specifically the function of an embodiment of the locking arrangement 10, 11 with the tip of the spring-loaded element 10 in an initial contact with the surface of the second panel 2.

Figure 16:
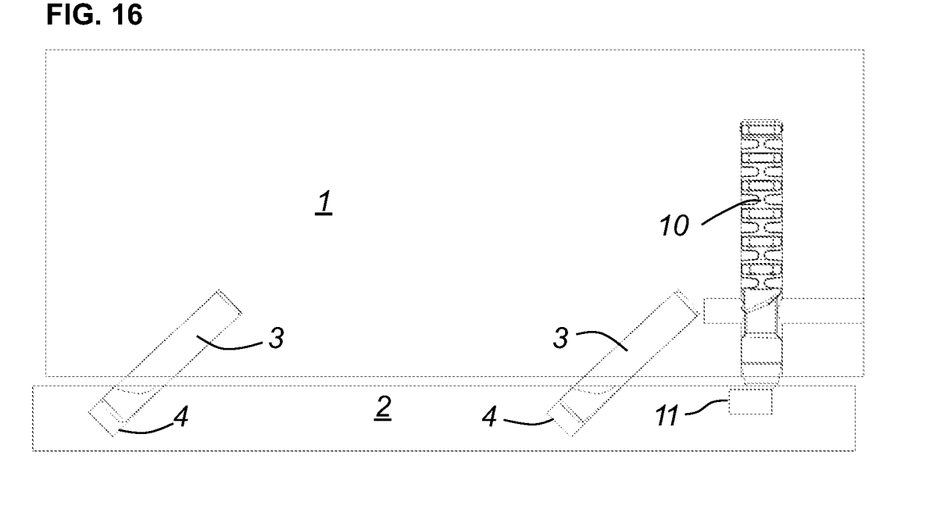
FIG. 16 is a side view of another embodiment of the two panels at a first contact stage.

FIG. 16 shows connection of an embodiment of the panels 1, 2 with an embodiment of the insertion recess 4 that does not comprise a counter sink. In this embodiment the rod-shaped element 3 is squeezed against the lower side 16 of the insertion recess.

Figure 17:
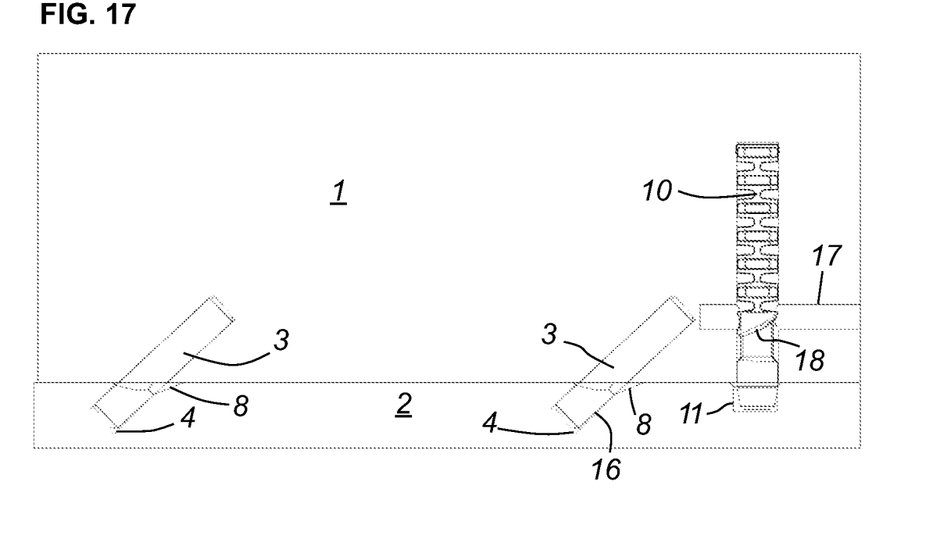
FIG. 17 is side view of two panels in a locked stage.

The two panels 1, 2 are shown in the locked position in FIG. 17 where the tip of the spring-loaded element 10 has been pushed to its final position in a recess 11. To unlock the two panels 1, 2, a tool (not shown) can be inserted in a groove 17 of the first panel 1 to push against an inclined surface 18 on the spring-loaded element 10.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

When the word "about" is used in this specification in connection with a numerical value, it is intended that the associated numerical value include a tolerance of +/−10% around the stated numerical value.

The indefinite articles "a" and "an," as used herein in the specification and in the claims, unless clearly indicated to the contrary, should be understood to mean "at least one."

The invention claimed is:

1. A mechanical connection arrangement for panels, comprising a first panel, a second panel and a mechanical locking device for locking the first panel to the second panel, wherein a surface of the first panel and a surface of the second panel are parallel and in contact in a locked position of the first and second panels, the mechanical locking device comprising at least one rod-shaped element at said surface of the first panel and at least one corresponding insertion recess at said surface of the second panel, wherein the rod-shaped element is configured to be inserted in the insertion recess, a lateral surface of the rod-shaped element extends at a first angle from the surface of the first panel, a lateral surface of the insertion recess extends into the second panel at a second angle from the surface of the second panel, wherein a difference between the first angle and the second angle is in a range of about 0.5° to about 6° in an unlocked position of the first and second panels, wherein the rod-shaped element and the insertion recess are configured such that a difference between the first angle and the second angle is smaller in the locked position compared to when in the unlocked position.

2. The mechanical connection arrangement according to claim 1, wherein in the unlocked position the difference between the first angle and the second angle is in a range of about 2° to about 4°.

3. The mechanical connection arrangement according to claim 1, wherein the rod-shaped element is made of a material that is harder than at least a core of the second panel.

4. The mechanical connection arrangement according to claim 1, wherein the second panel has an outer layer adjacent said surface of the second panel that is harder than the material in a core of the second panel.

5. The mechanical connection arrangement according to claim 1, wherein the rod-shaped element is made from one of or a combination of wood-based materials, polymers, and metals.

6. The mechanical connection arrangement according to claim 1, wherein at least a core of the second panel is wood-based or plastic with or without fillers.

7. The mechanical connection arrangement according to claim 1, wherein the rod-shaped element is cylinder-shaped and the insertion recess has a circular cross section, the diameter of the rod-shaped element being about 90% to 98% of the diameter of the insertion recess.

8. The mechanical connection arrangement according to claim 1, wherein both the first and second angles are in a range of about 30° to about 60°.

9. The mechanical connection arrangement according to claim 1, wherein the thickness of the second panel is larger than the diameter of the rod-shaped element and smaller than three times the diameter of the rod-shaped element.

10. The mechanical connection arrangement according to claim 1, wherein the first angle is smaller than the second angle.

11. The mechanical connection arrangement according to claim 1, wherein the insertion recess comprises an upper side and an opposite lower side, wherein the length of contact between the rod-shaped element and the insertion recess on the upper side is longer than the radius of the rod-shaped element and shorter than two times the diameter of the rod-shaped element.

12. The mechanical connection arrangement according to claim 1, wherein the insertion recess has a countersink.

13. The mechanical connection arrangement according to claim 12, wherein the insertion recess comprises an upper side and an opposite lower side, and wherein the lower side comprises the countersink.

14. The mechanical connection arrangement according to claim 1, wherein the first panel further comprises a second rod-shaped element extending at the same angle as said first rod-shaped element, the second rod-shaped element which is shorter than said first rod-shaped element.

15. The mechanical connection arrangement according to claim 1, wherein the first panel further comprises a second rod-shaped element, wherein in the locked position the first rod-shaped element extends deeper into the insertion recess than the second rod-shaped element extends into a second insertion recess.

16. The mechanical connection arrangement according to claim 1, wherein in the locked position a difference between the first angle and the second angle is in a range of about 0° to about 3°.

17. The mechanical connection arrangement according to claim 1, further comprising a locking arrangement.

18. A method for connecting two panels to one another with an arrangement according to claim 1 comprising:
   placing the first panel with the rod-shaped element such that the tip of the rod-shaped element is arranged at an opening of the insertion recess of the second panel and such that the axis of the rod-shaped element is aligned with the axis of the insertion recess,
   bringing the first and second panels together by inserting the rod-shaped element into the insertion recess,
   pressing the first and second panels together such that the surface of the first panel and the surface of the second panel come into full contact with each other and a locked position by the rod-shaped element partially compressing an inside of the insertion recess to plastic and/or elastic deformation and/or partially compressing a side of the rod-shaped element to plastic and/or elastic deformation inside the insertion recess and/or bending the rod-shaped element plastically and/or elastically.

* * * * *